United States Patent
Nakashima (10) Patent No.: US 11,878,568 B2
(45) Date of Patent: Jan. 23, 2024

(54) BLOWOUT STRUCTURE OF AIR CONDITIONER

(71) Applicant: HONDA MOTOR CO., LTD., Tokyo (JP)

(72) Inventor: Yu Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/868,198

(22) Filed: Jul. 19, 2022

(65) Prior Publication Data
US 2023/0021919 A1 Jan. 26, 2023

(30) Foreign Application Priority Data
Jul. 21, 2021 (JP) .................................. 2021-120459

(51) Int. Cl.
*B60H 1/34* (2006.01)
*B60H 1/00* (2006.01)

(52) U.S. Cl.
CPC ................................ *B60H 1/00671* (2013.01)

(58) Field of Classification Search
USPC .................................................. 454/152–155
See application file for complete search history.

(56) References Cited

U.S. PATENT DOCUMENTS

| | | | | |
|---|---|---|---|---|
| 6,059,652 A * | 5/2000 | Terry | ................... | B60H 1/3435 454/316 |
| 10,350,968 B2 * | 7/2019 | Avendano Arenas | ....................... | B60H 3/0028 |
| 11,273,688 B2 * | 3/2022 | Doll | ..................... | B60H 1/3414 |
| 11,701,946 B2 * | 7/2023 | Kim | ................... | B60H 1/00685 454/155 |
| 2006/0223430 A1 * | 10/2006 | Shibata | ................. | F24F 13/075 454/155 |
| 2008/0119125 A1 * | 5/2008 | Guerreiro | ............. | B60H 1/345 454/75 |
| 2016/0250909 A1 * | 9/2016 | Schneider | ........... | B60H 1/3421 454/155 |
| 2019/0168583 A1 * | 6/2019 | Dinant | ................. | B60H 1/3428 |

(Continued)

FOREIGN PATENT DOCUMENTS

JP   S62-149742 U   9/1987
JP   H5-332608 A   12/1993
(Continued)

OTHER PUBLICATIONS

Japanese Office Action received in corresponding Japanese application No. 2021-120459 dated Apr. 25, 2023 with English translation (8 pages).

*Primary Examiner* — Ko-Wei Lin
(74) *Attorney, Agent, or Firm* — Rankin, Hill & Clark LLP (57) ABSTRACT

A blowout structure of the present invention includes: a case connected to a duct that serves as a blast passage from an air conditioner; a main ventilation passage formed inside the case; a vertical fin that changes a wind direction by rotating in a vehicle left-right direction of the main ventilation passage; and a bypass flow path extending along the main ventilation passage on both sides of the main ventilation passage in the vehicle left-right direction, wherein an outlet of the bypass flow path that joins the main ventilation passage is formed so as to overlap with the vertical fin when viewed in the vehicle left-right direction.

5 Claims, 11 Drawing Sheets

(56) References Cited

U.S. PATENT DOCUMENTS

| | | | | |
|---|---|---|---|---|
| 2019/0322153 | A1* | 10/2019 | Kim | ................... B60H 1/00685 |
| 2020/0254850 | A1* | 8/2020 | Doll | ..................... B60H 1/3414 |
| 2021/0001692 | A1* | 1/2021 | Schaal | ................. B60H 1/3414 |
| 2021/0237539 | A1* | 8/2021 | Habte | ................ B60H 1/00485 |
| 2023/0182544 | A1* | 6/2023 | Kikuchi | .................. B60H 1/34 |
| | | | | 454/155 |

FOREIGN PATENT DOCUMENTS

| | | |
|---|---|---|
| JP | 2006-168751 A | 6/2006 |
| JP | 2007-055427 A | 3/2007 |
| JP | 3156703 U | 1/2010 |
| JP | 2015-161440 A | 9/2015 |
| JP | 2017-94989 A | 6/2017 |
| JP | 2020-203561 A | 12/2020 |

\* cited by examiner

BLOWOUT STRUCTURE OF AIR CONDITIONER

BACKGROUND OF THE INVENTION

1. Field of the Invention

The present invention relates to a blowout structure of an air conditioner.

2. Description of the Related Art

As a blowout structure (register) of an air conditioner, there has heretofore been known one having a square cylindrical case forming a ventilation passage and a plurality of flat-plate rotating fins arranged so as to line up in parallel with each other on one end opening side of the case that serves as an air outlet (see, for example, Patent Literature 1). Such a blowout structure allows a direction (wind direction) of air blown out of the air outlet to be adjusted according to the angle of the rotating fins.

In such a conventional blowout structure, among the plurality of rotating fins lined up at the air outlet, the rotating fin at the outer end adjacent to the inner wall surface of the case may not sufficiently control the wind direction. To be more specific, when rotating ends of the rotating fins located on the downstream side of the airflow are tilted away from the inner wall surface of the case, an air through flow is formed, which is a linear flow of air along the inner wall surface of the case.

Therefore, the conventional blowout structure (see, for example, Patent Literature 1) has a rib protruding from the inner wall surface of the case toward the rotating fin side. This rib suppresses the generation of a through flow that tends to flow along the inner wall surface of the case.

PRIOR ART DOCUMENT(S)

[Patent Literature(s)]
Patent Literature 1: JP2007-055427A

SUMMARY OF THE INVENTION

However, in the conventional blowout structure (see, for example, Patent Literature 1), the rib causes a new problem that the cross-sectional area of the flow path of the ventilation passage is reduced and pressure loss is increased. Such a blowout structure also causes a problem that good wind directivity achieved by the rotating fins is hindered by airflow stagnation around the rib at the time of blowing air.

It is an object of the present invention to provide a blowout structure of an air conditioner capable of reducing pressure loss at the time of blowing air and achieving good wind directivity as compared with the conventional structure.

A blowout structure of an air conditioner according to the present invention that solves the above problems includes: a case connected to a duct that serves as a blast passage from the air conditioner of a vehicle; an inlet provided on the duct side of the case and connected to the duct; an outlet that is provided on the vehicle interior side of the case and blows out wind toward the vehicle interior; a main ventilation passage formed inside the case from the inlet to the outlet; a first wind direction adjuster that changes a wind direction from the inlet to the outlet by rotating in a vehicle left-right direction of the main ventilation passage; and a bypass flow path of the main ventilation passage, which extends along the main ventilation passage on both sides of the main ventilation passage in the vehicle left-right direction. An outlet of the bypass flow path that joins the main ventilation passage is formed so as to overlap with the first wind direction adjuster when viewed in the vehicle left-right direction.

The blowout structure of the present invention can reduce pressure loss at the time of blowing air and achieve good wind directivity as compared with conventional structures.

DETAILED DESCRIPTION OF THE EMBODIMENTS

Next, an embodiment for implementing a blowout structure of an air conditioner according to the present invention will be described in detail with reference to the drawings as appropriate.

The blowout structure of this embodiment is mainly characterized in that a main ventilation passage for passing air blown from the air conditioner and a bypass flow path of the main ventilation passage are provided in a case that houses fins for changing a wind direction, and that an outlet of the bypass flow path that joins the main ventilation passage faces the fin (first fin).

In the following description, front, back, left, right, upper, and lower are based on the directions indicated by the arrows in each of the drawings that correspond to the front, back, left, right, upper, and lower of a vehicle equipped with this blowout structure.

Figure 1:
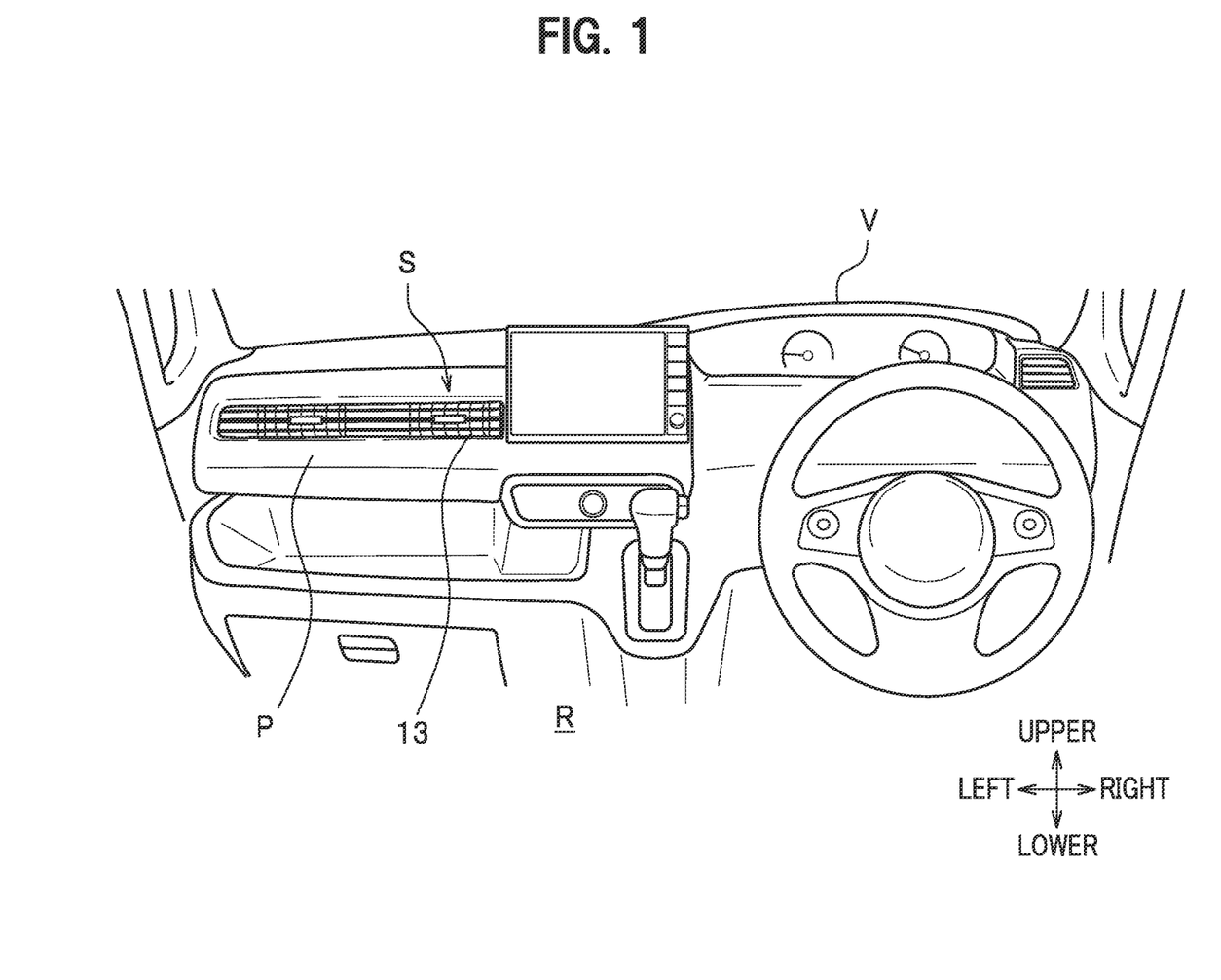
FIG. 1 is a front view of an instrument panel of a vehicle provided with a blowout structure according to an embodiment of the present invention.

FIG. 1 is a front view of an instrument panel P of a vehicle V provided with a blowout structure S according to this embodiment.

A plurality of the blowout structures S of this embodiment are arranged in line in a vehicle width direction so as to correspond to a driver seat and a passenger seat, respectively. The blowout structure S will be specifically described by taking one provided so as to correspond to the passenger seat as an example.

As shown in FIG. 1, the blowout structure S is attached to the instrument panel P so that its outlet 13 faces a vehicle interior R side. To be more specific, the outlet 13 is arranged on a vertical wall of the instrument panel P so as to face a passenger seated in the passenger seat (not shown).

Figure 2:
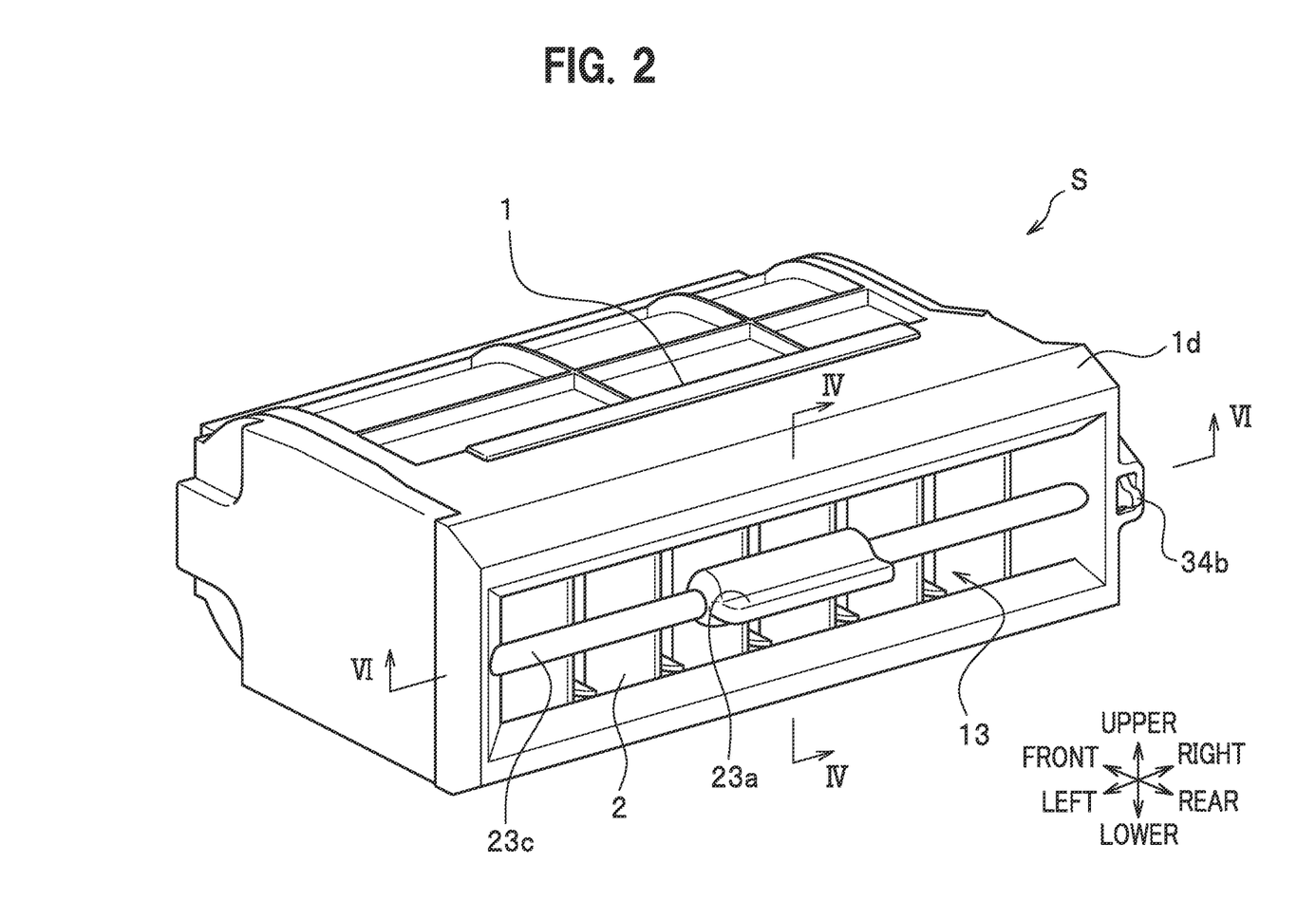
FIG. 2 is an overall perspective view of the blowout structure according to the embodiment of the present invention.
Figure 3:
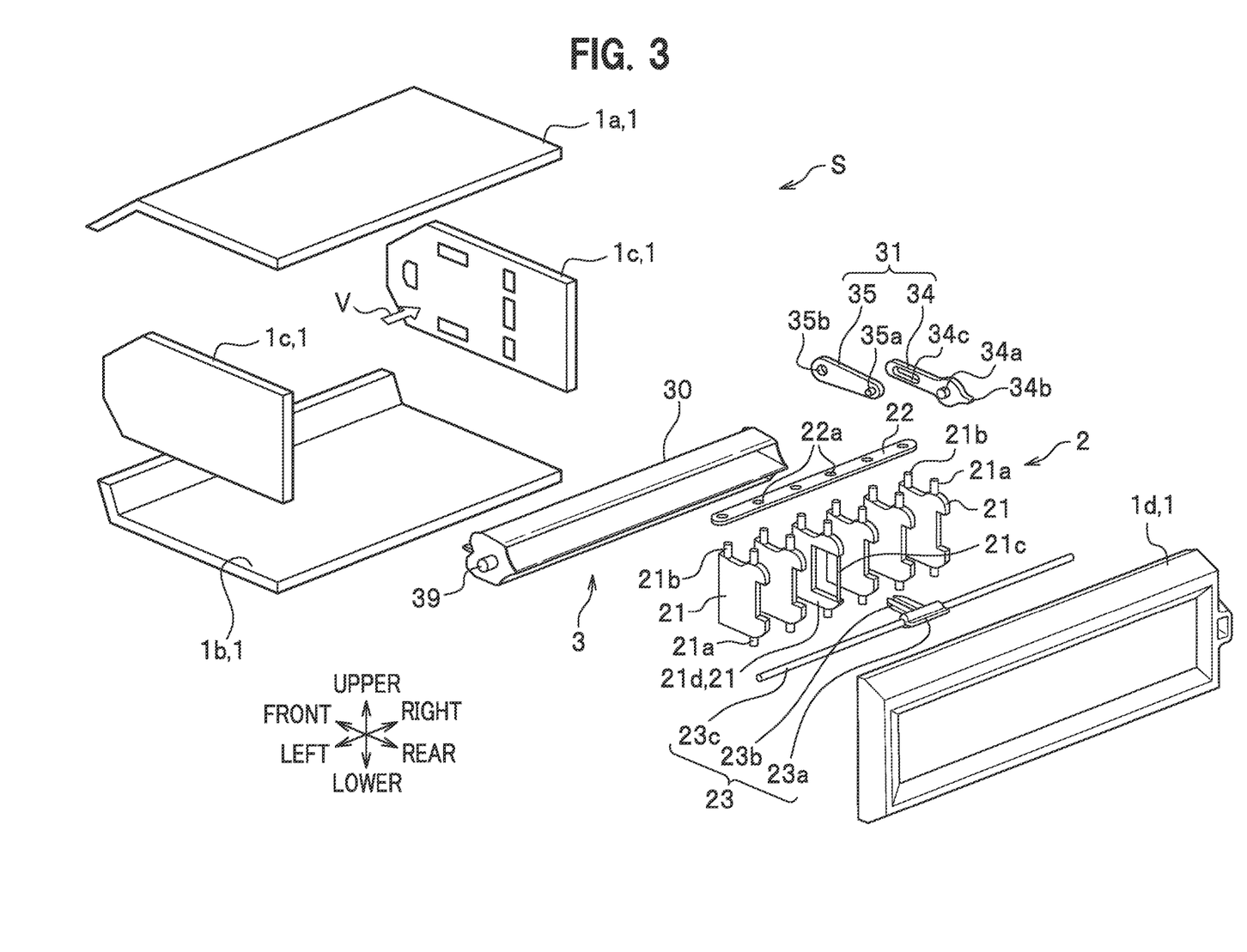
FIG. 3 is an exploded perspective view of the blowout structure shown in FIG. 2.

FIG. 2 is an overall perspective view of the blowout structure S. FIG. 3 is an exploded perspective view of the blowout structure S.

As shown in FIG. 2, the blowout structure S includes a case 1 made of a square cylinder and a first wind direction adjuster 2 housed in the case 1 on one end side (rear side in FIG. 2) of the case 1 that serves as the outlet 13. As shown in FIG. 3, the blowout structure S further includes a second wind direction adjuster 3 housed in the case 1 on the other end side (front side in FIG. 3) of the case 1. The first and second wind direction adjusters 2 and 3 are each configured including fins for changing the wind direction as will be described later.

<Case>

As shown in FIG. 3, the case 1 includes an upper plate member 1a, a lower plate member 1b, a side plate member 1c, and a bezel member 1d.

The case 1 forms the square cylinder by integrating these members 1a to 1d. A main ventilation passage 5 (see FIG. 4) to be described later having a rectangular flow path cross-section is formed inside the case 1.

Figure 4:
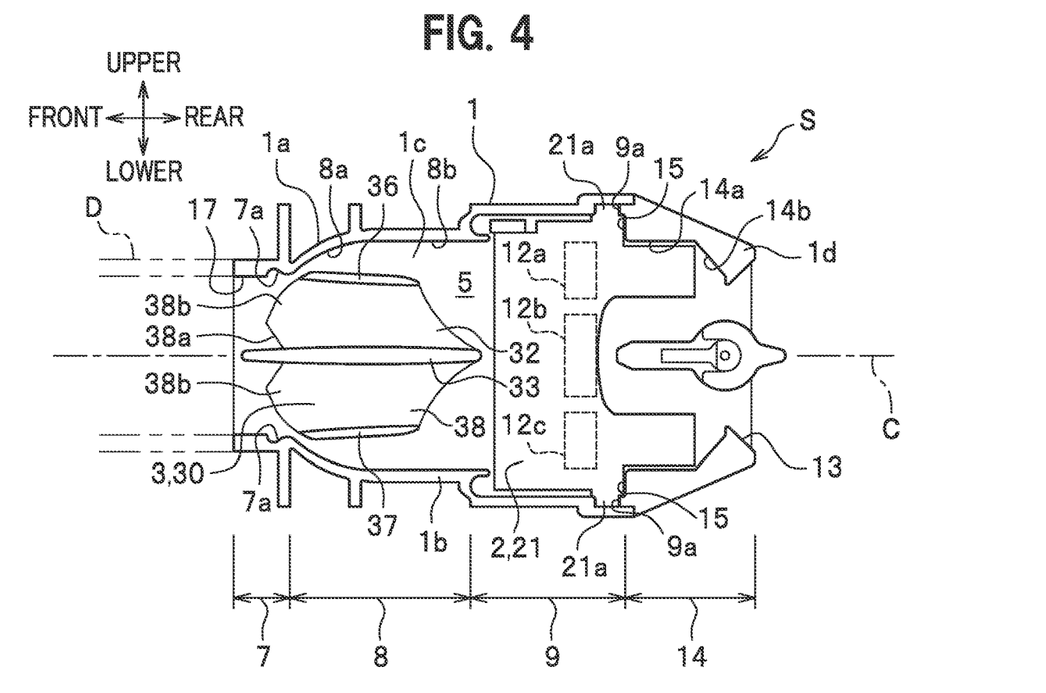
FIG. 4 is a cross-sectional view taken along the line IV-IV in FIG. 2.

FIG. 4 is a cross-sectional view taken along the line IV-IV in FIG. 2. In FIG. 4, reference numeral D denotes a duct indicated by a virtual line (chain double-dashed line), which serves as a blast passage from the air conditioner (not shown).

The upper and lower plate members 1a and 1b have symmetrical shapes with respect to a center line C extending in a front-rear direction of the case 1 in the side view shown in FIG. 4.

To be more specific, the upper and lower plate members 1a and 1b face each other, so that a duct connector 7, a drum fin arrangement portion 8, and a vertical fin arrangement portion 9 are formed between a pair of side plate members 1c (see FIG. 3).

The duct connector 7 is connected to the duct D and forms an inlet 17 of air (wind) in the blowout structure S. The second wind direction adjuster 3 (drum fin 30) to be described later has its front end arranged inside the duct connector 7.

At the rear portion of the duct connector 7, stopper faces 7a that regulate the rotation angle of the drum fin 30 are formed on the plate member 1a and the lower plate member 1b, respectively. These stopper faces 7a that function as locks for the drum fin 30 will be described in detail later together with the drum fin 30.

The drum fin arrangement portion 8 is provided on the downstream side of the duct connector 7. In the drum fin arrangement portion 8, a vertical spacing between the upper and lower plate members 1a and 1b is wider than that in the duct connector 7 so that the drum fin 30 to be described later can be rotated at a predetermined angle about a shaft portion 39 (see FIG. 7) to be described later.

A curved portion 8a that is curved along the rotation locus of the rear portion of the drum fin 30 is formed in the front part of the drum fin arrangement portion 8.

The downstream side of the curved portion 8a in the drum fin arrangement portion 8 serves as a general portion 8b extending to the vertical fin arrangement portion 9 described below in which the spacing between the upper and lower plate members 1a and 1b is substantially constant.

The vertical fin arrangement portion 9 has a wider vertical spacing between the upper and lower plate members 1a and 1b than the general portion 8b of the drum fin arrangement portion 8. The vertical spacing between the upper and lower plate members 1a and 1b in the vertical fin arrangement portion 9 is substantially constant in the front-rear direction.

Inside such a vertical fin arrangement portion 9, a front-side portion of a vertical fin 21 included in the first wind direction adjuster 2 is arranged.

A vertical width of this front-side portion located in front of a rotation shaft 21a of the vertical fin 21 is wider than the vertical spacing between the upper and lower plate members 1a and 1b in the general portion 8b of the drum fin arrangement portion 8.

A bearing 9a of the rotation shaft 21a is formed at the rear portions of the upper and lower plate members 1a and 1b in the vertical fin arrangement portion 9. A front portion of the bezel member 1d to be described next is connected to the rear portions of the upper and lower plate members 1a and 1b and the side plate member 1c forming the vertical fin arrangement portion 9.

As shown in FIG. 3, the bezel member 1d is formed of a frame having a rectangular opening.

As shown in FIG. 4, the bezel member 1d is arranged on the most downstream side as the vehicle interior side of the case 1, and forms the outlet 13 of air blown from the air conditioner (not shown).

That is, inside the case 1, the main ventilation passage 5 is formed for wind from the inlet 17 to the outlet 13.

Such a bezel member 1d has an airflow guide portion 14 inside.

As will be described in detail later, the airflow guide portion 14 is configured to guide the airflow changed inside the main ventilation passage 5 in a predetermined direction according to the rotation angle of the drum fin 30.

As shown in FIG. 4, the airflow guide portion 14 includes: a general portion 14a having a vertical spacing substantially constant along the front-rear direction; and an inclined portion 14b that is connected to the rear side of the general portion 14a and inclined so that the vertical spacing is gradually narrowed toward the rear side.

The vertical spacing inside the bezel member 1d in the general portion 14a is set to be substantially equal to the vertical spacing between the upper and lower plate members 1a and 1b in the general portion 8b of the drum fin arrangement portion 8.

Inside such a general portion 14a, a rear portion of the vertical fin 21 located behind the rotation shaft 21a of the vertical fin 21 is arranged.

Upper and lower vertical wall surfaces 15 formed at the front end of the bezel member 1d as a step between the inside of the bezel member 1d and the vertical fin arrangement portion 9 in the general portion 14a serve as contact surfaces of the vertical fin 21 in a fin shut state to be described later.

Next, the side plate member 1c (see FIG. 3) of the case 1 will be described in more detail.

Figure 5:
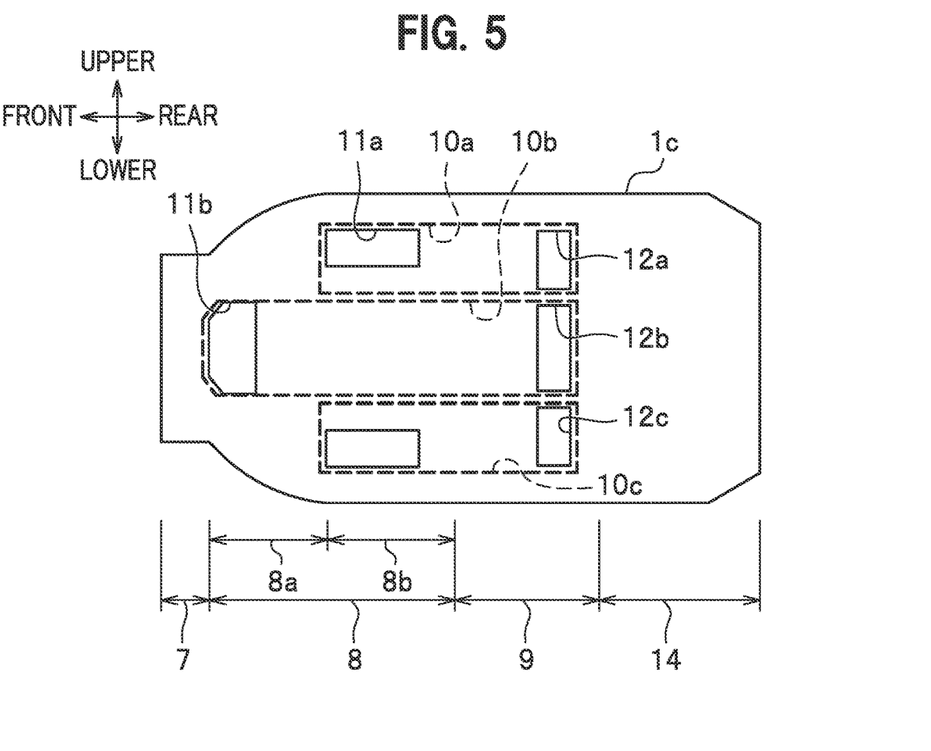
FIG. 5 is a side view of a side plate member seen from a V-direction of FIG. 3.

FIG. 5 is a side view of the side plate member 1c seen from a V-direction in FIG. 3. The side plate member 1c shown in FIG. 5 corresponds to the right side plate member 1c of the pair of left and right side plate members 1c (see FIG. 3) included in the case 1, and these side plate members 1c are configured symmetrically with each other. Therefore, the right side plate member 1c will be mainly described below and detailed description of the left side plate member 1c will be omitted. In FIG. 5, bypass flow paths 10a, 10b, and 10c are drawn with hidden lines (dotted lines). Further, in FIG. 5, reference numerals are assigned corresponding to the duct connector 7, the drum fin arrangement portion 8, and the vertical fin arrangement portion 9 shown in FIG. 4.

As shown in FIG. 5, inside the side plate member 1c in a thickness direction (vertical direction in FIG. 5), three rows of upper and lower bypass flow paths 10a to 10c branching off from the main ventilation passage 5 (see FIG. 4) are formed so as to extend in the front-rear direction.

The upper bypass flow path 10a and the lower bypass flow path 10c extend from the front part of the general portion 8b in the drum fin arrangement portion 8 to the rear part of the vertical fin arrangement portion 9.

The middle bypass flow path 10b extends from the rear part of the duct connector 7 to the rear part of the vertical fin arrangement portion 9.

The middle bypass flow path 10b is set to have a wider vertical width than the upper and lower bypass flow paths 10a and 10c. The upper and lower bypass flow paths 10a and 10c are also set to have substantially the same vertical width.

An inlet 11a is formed at the front end of the bypass flow path 10a, and an outlet 12a is formed at the rear end of the bypass flow path 10a.

The inlet 11a has a rectangular shape that is shifted toward the upper side in the vertical width direction of the bypass flow path 10a and extends long in the front-rear direction.

The outlet 12a has a rectangular opening formed with substantially the same vertical width as that of the bypass flow path 10a. The inlet 11a has its opening area set to be larger than that of the outlet 12a.

An inlet 11b is formed at the front end of the bypass flow path 10b, and an outlet 12b is formed at the rear end of the bypass flow path 10b.

The inlet 11b has a substantially D-shaped opening formed with substantially the same vertical width as that of the bypass flow path 10b.

The outlet 12b has a rectangular opening having substantially the same vertical width as that of the bypass flow path 10b and substantially the same horizontal width as that of the outlet 12a of the bypass flow path 10a.

The inlet 11b has its opening area set to be larger than that of the outlet 12b.

An inlet 11c is formed at the front end of the bypass flow path 10c, and an outlet 12c is formed at the rear end of the bypass flow path 10c.

The inlet 11c has a rectangular shape that is shifted downward in the vertical width direction of the bypass flow path 10c and extends long in the front-rear direction.

The outlet 12c has a rectangular opening having a vertical width substantially the same as the vertical width of the bypass flow path 10c and a horizontal width substantially the same as the horizontal width of the outlet 12a of the bypass flow path 10a.

The opening area of the inlet 11c is set to be larger than the opening area of the outlet 12c.

As shown in FIG. 5, these outlets 12a to 12c in the bypass flow paths 10a, 10b, 10c are arranged in line in the vertical direction in the vertical fin arrangement portion 9.

That is, as shown in FIG. 4, the outlets 12a to 12c are formed so as to overlap with the vertical fin 21 of the first wind direction adjuster 2 when viewed in the vehicle width direction (perpendicular to the paper space of FIG. 4).

In the following description, when it is not necessary to particularly distinguish the bypass flow paths 10a to 10c, the bypass flow paths may be simply referred to as the "bypass flow path 10". Likewise, when it is not necessary to particularly distinguish the outlets 12a to 12c, the outlets may be simply referred to as the "outlet 12".

<First Wind Direction Adjuster>

As shown in FIG. 3, the first wind direction adjuster 2 mainly includes a plurality of vertical fins 21, a connecting member 22, and an operator 23.

The vertical fin 21 corresponds to a "first fin" in the claims.

The vertical fins 21 are made of a plate body and are arranged in the vehicle width direction (left-right direction) so that the plate surfaces are parallel to each other.

The vertical fin 21 includes a rotation shaft 21a supported by the bearing 9a (see FIG. 4) and a connecting pin 21b supported by the connecting member 22.

The rotation shaft 21a projects in the vertical direction from upper and lower edges of the vertical fin 21. The connecting pin 21b projects upward from the upper edge of the vertical fin 21 on the upstream side of the rotation shaft 21a.

Among the plurality of vertical fins 21, one vertical fin 21d located in the middle in the left-right direction has an engaging pin 21c with which the operator 23 to be described later is engaged. The engaging pin 21c extends in the vertical direction on the downstream side of the rotation shaft 21a.

As shown in FIG. 3, the connecting member 22 has a plurality of holes 22a arranged at predetermined intervals along its longitudinal direction. The connecting pins 21b of the plurality of vertical fins 21 maintained in a parallel state are rotatably fitted into the holes 22a, respectively. Thus, the plurality of vertical fins 21 are integrally connected via the connecting member 22.

As shown in FIG. 3, the operator 23 includes a grip portion 23a for a user, a bifurcated portion 23b protruding forward from the grip portion 23a, and a guide bar 23c that slidably supports the grip portion 23a in the left-right direction.

Figure 6:
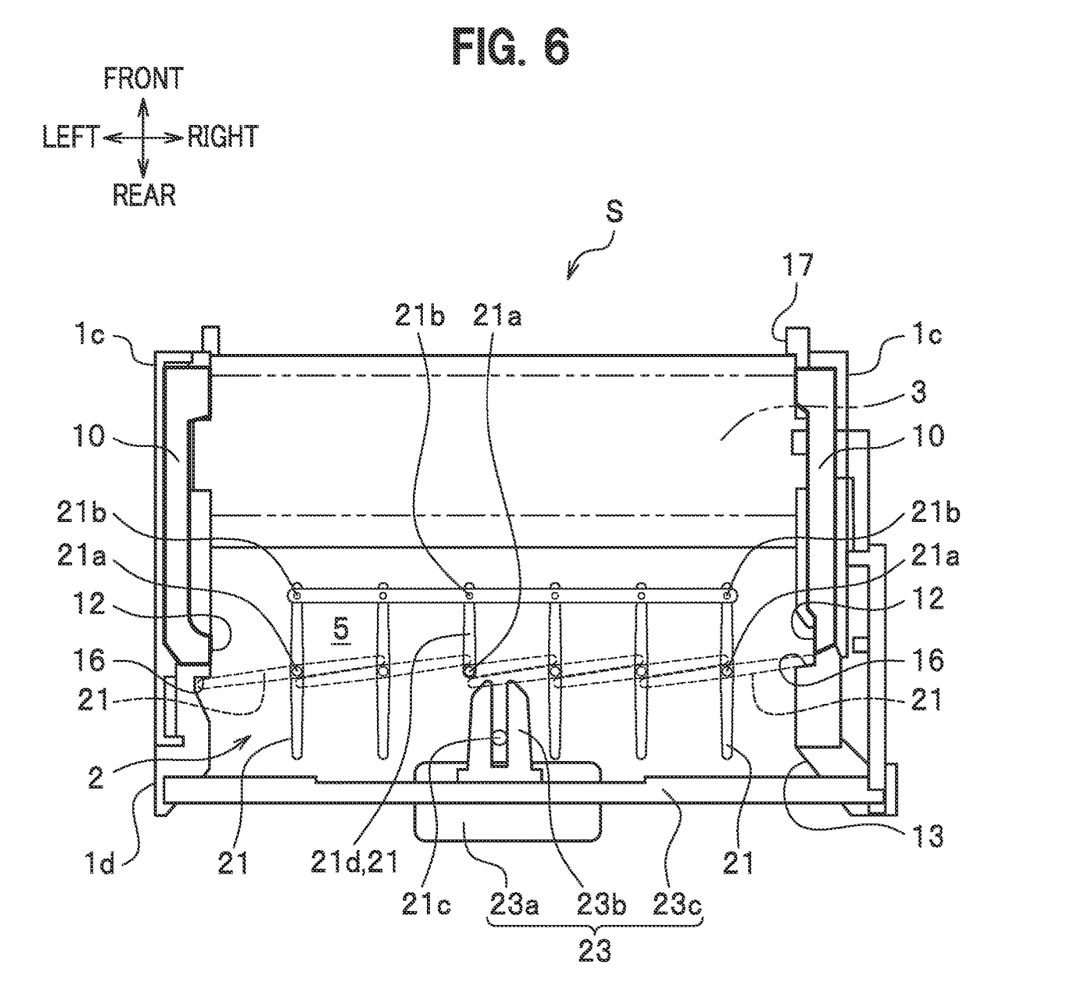
FIG. 6 is a cross-sectional view taken along the line VI-VI in FIG. 2, including a cross-section of a first wind direction adjuster.

FIG. 6 is a cross-sectional view taken along the line VI-VI in FIG. 2, including a cross-section of the first wind direction adjuster 2.

As shown in FIG. 6, both ends of the guide bar 23c that supports the grip portion 23a are supported by the bezel member 1d. The engaging pin 21c of the vertical fin 21 described above is fitted into the bifurcated portion 23b of the operator 23 so as to be movable in the front-rear direction.

In the first wind direction adjuster 2 as described above, when the user slides the grip portion 23a of the operator 23 in the left-right direction, the engaging pin 21c of the vertical fin 21d rotates the vertical fin 21d around the rotation shaft 21a while moving in the front-rear direction inside the bifurcated portion 23b.

In this event, the other vertical fins 21 connected by the connecting member 22 via the connecting pins 21b of the vertical fins 21d are each rotated around each rotation shaft 21a in conjunction with the vertical fin 21d. Thus, the vertical fins 21 (including the vertical fin 21d) change the direction of windblown out of the outlet 13 according to the rotation angle.

The rotated vertical fins 21 (including the vertical fin 21d) overlap with each other as indicated by the dotted lines in FIG. 6 and are set in a fin shut state to close the outlet 13.

The outlet 12 of the bypass flow path 10 faces the vertical fin 21 on the upstream side of the vertical fin 21, preferably on the upstream side of the rotation shaft 21a, so as to come close to the rotation shaft 21a.

As shown in FIG. 6, a stopper face 16 is formed inside the bezel member 1d as a lock to maintain the rotation angle of the vertical fin 21 in the fin shut state.

As described above, the vertical fins 21 in the fin shut state come into contact with the upper and lower vertical wall surfaces 15 (see FIG. 4) of the bezel member 1d.

<Second Wind Direction Adjuster>

Next, the second wind direction adjuster 3 (see FIG. 3) will be described.

As shown in FIG. 3, the second wind direction adjuster 3 mainly includes a drum fin 30 and a link mechanism 31 for rotating the drum fin 30.

The drum fin 30 corresponds to a "second fin" in the claims.

Figure 7:
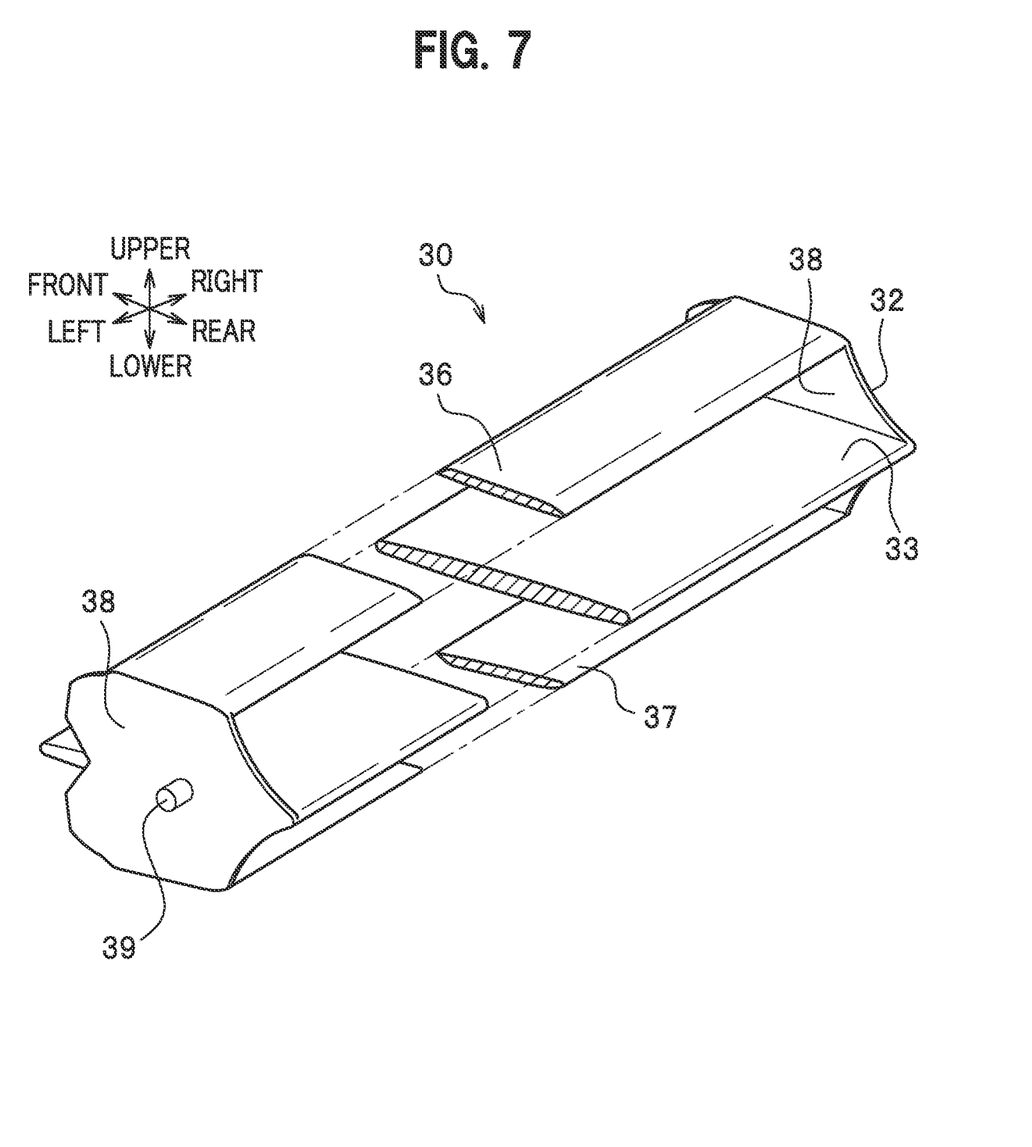
FIG. 7 is an overall perspective view of a drum fin included in a second wind direction adjuster.

FIG. 7 is an overall perspective view of the drum fin 30.

As shown in FIG. 7, the drum fin 30 is a member long in the vehicle width direction (left-right direction) and includes a square cylindrical drum fin main body 32 having an opening in the front-rear direction and an intermediate fin 33 formed of a flat plate-shaped horizontal fin for partitioning the inside of the drum fin main body 32 into upper and lower sections.

The drum fin main body 32 includes an upper fin 36 and a lower fin 37, which are formed of flat plate-shaped horizontal fins, and end plates 38.

The upper and lower fins 36 and 37 are each formed of a plate long in the left-right direction with a rectangular planar shape. The upper and lower fins 36 and 37 are also set to have substantially the same width in the front-rear direction.

Referring back to FIG. 4, spacing between the upper and lower fins 36 and 37 is gradually reduced from the upstream side toward the downstream side. That is, the opening cross-sectional area on the rear side (downstream side) of the drum fin main body 32 is slightly smaller than that on the front side (upstream side).

As shown in FIG. 7, the intermediate fin 33 is formed of a plate long in the left-right direction with a rectangular planar shape. The intermediate fin 33 is wider than the front-rear width of the upper fin 36 (or the lower fin 37).

The intermediate fin 33 is arranged between the upper and lower fins 36 and 37, and is integrally connected to the upper and lower fins 36 and 37 by a pair of left and right end plates 38.

In the plan view shown in FIG. 4, the endplate 38 is inclined so that its rear edge approaches the rear end of the intermediate fin 33 toward the rear from the rear end side of the upper fin 36 and is also inclined so that its rear edge approaches the rear end of the intermediate fin 33 toward the rear from the rear end side of the lower fin 37.

In the plan view shown in FIG. 4, the front edge of the end plate 38 has bypass flow path on-off valves 38b that bulge forward at the upper and lower positions sandwiching a notch recess 38a formed around the front end portion of the intermediate fin 33.

As will be described later, these pair of bypass flow path on-off valves 38b open and close the inlet 11b (see FIG. 5) of the bypass flow path 10b according to the rotation angle of the drum fin 30.

As shown in FIG. 7, the end plate 38 is provided with a shaft portion 39.

The shaft portion 39 is formed so as to protrude in the left-right direction from the end plate 38 at a position corresponding to the center of the intermediate fin 33 in the front-rear direction.

In FIG. 7, as for the shaft portions 39 provided on the pair of end plates 38, description of the shaft portion 39 of the right end plate 38 is omitted for convenience of drawing.

When the drum fin 30 shown in FIG. 7 is arranged in the drum fin arrangement portion 8 (see FIG. 4), the drum fin 30 is rotatably supported by the side plate member 1c (see FIG. 3) of the case 1 (see FIG. 3) via the shaft portion 39.

Next, the link mechanism 31 (see FIG. 3) will be described.

As shown in FIG. 3, the link mechanism 31 includes a plate-shaped lever member 34 long in one direction and an arm member 35.

A shaft support portion 34a for the bezel member 1d and a grip portion 34b are formed at the rear portion of the lever member 34. As shown in FIG. 2, the grip portion 34b projects toward the vehicle interior side through a small hole formed in the bezel member 1d.

A long hole 34c is also formed in the front portion of the lever member 34.

As shown in FIG. 3, a pin portion 35a to be fitted into the long hole 34c of the lever member 34 is formed at the rear portion of the arm member 35. Further, in the front portion of the arm member 35, a hole portion 35b is formed to fix the shaft portion (not shown) provided on the right end plate 38 of the drum fin 30 by press fitting or the like, for example.

According to this link mechanism 31, when the user moves the grip portion 34b up and down, the drum fin 30 is rotated around the shaft portion 39 via the lever member 34 and the arm member 35.

<Operation of Blowout Structure>

Next, an operation of the blowout structure S according to this embodiment will be described.

Figure 8A:
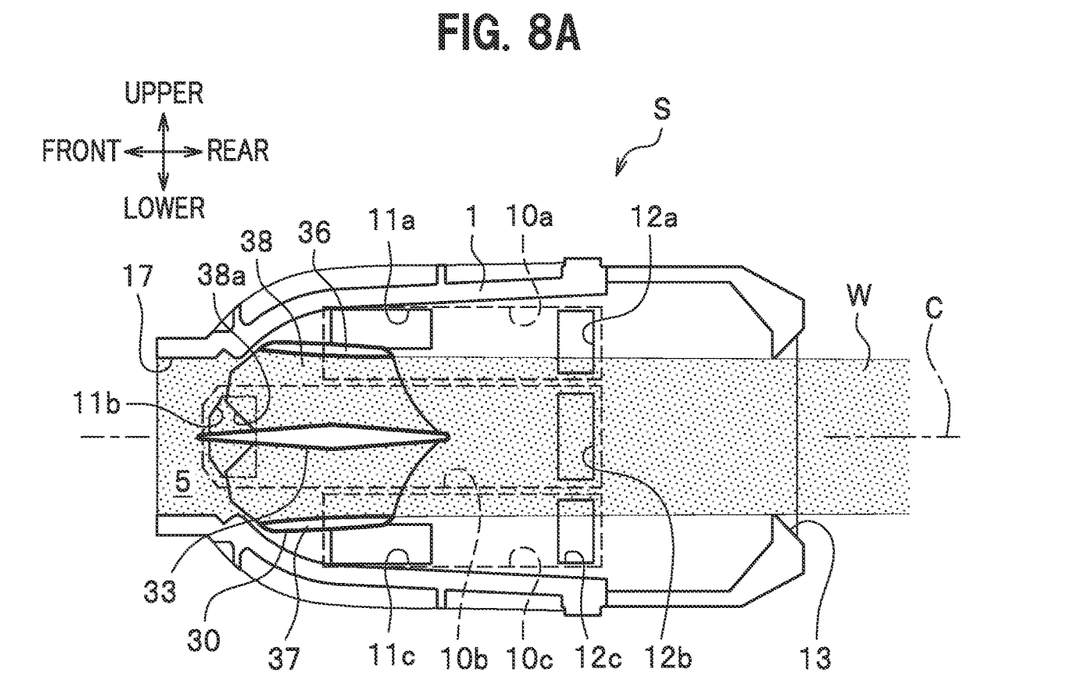
FIG. 8A is an operation explanatory diagram of the blowout structure when blowing air straight backward.
Figure 8B:
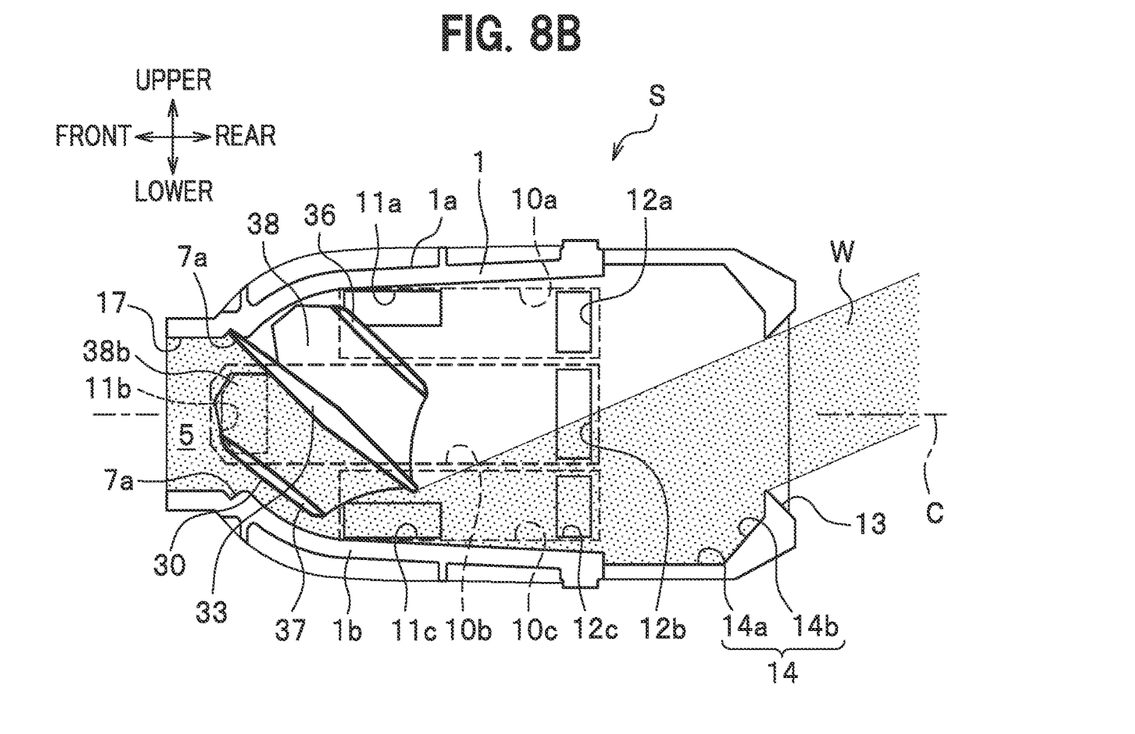
FIG. 8B is an operation explanatory diagram of the blowout structure when blowing air upward.
Figure 8C:
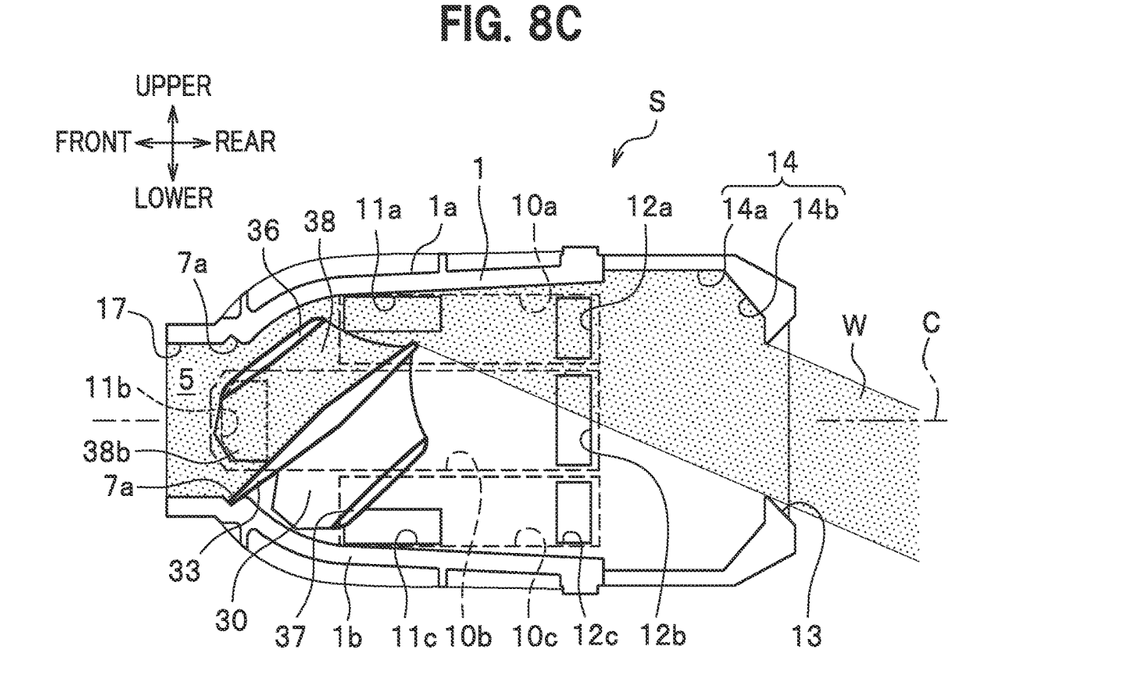
FIG. 8C is an operation explanatory diagram of the blowout structure when blowing air downward.
Figure 9:
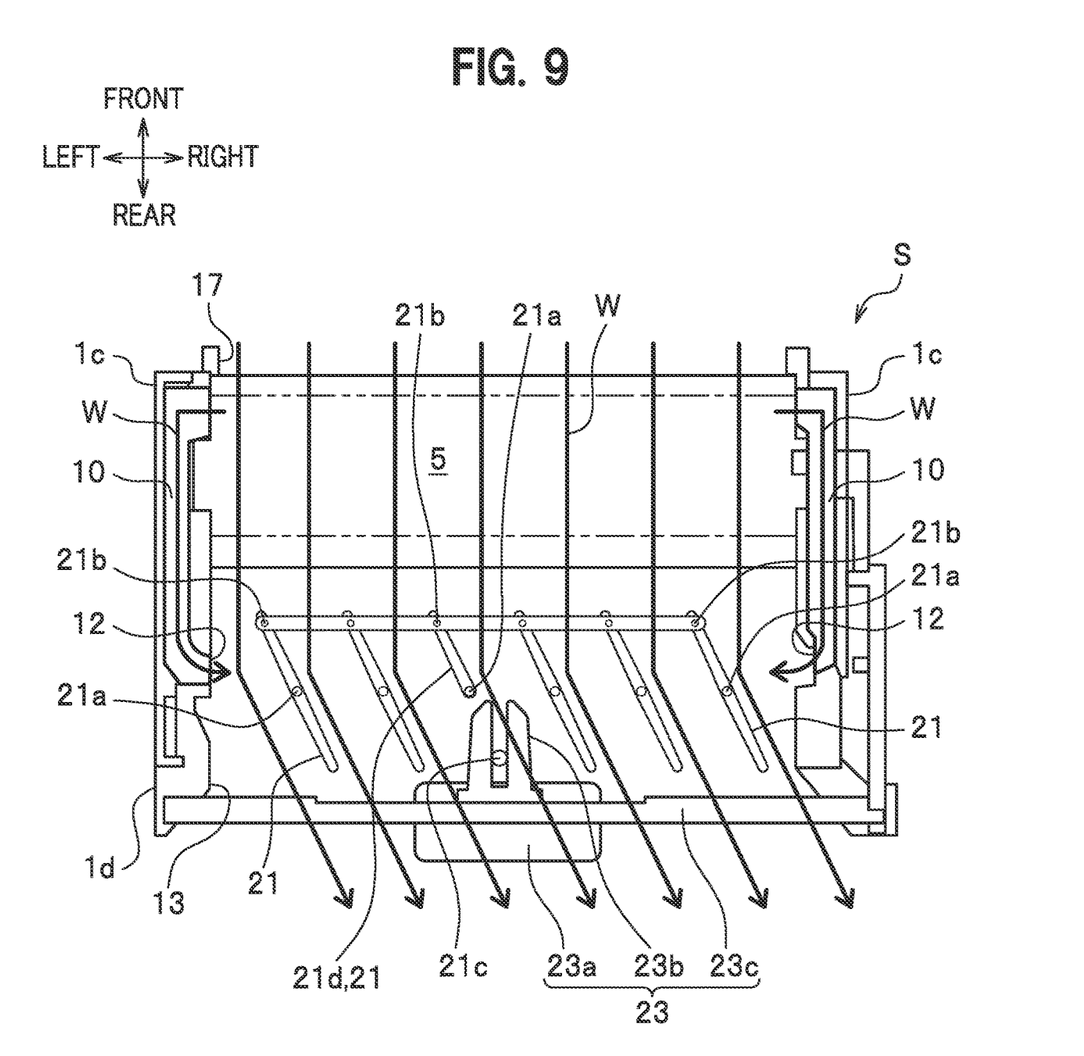
FIG. 9 is an operation explanatory diagram of the blowout structure when blowing air rightward.

FIG. 8A is an operation explanatory diagram of the blowout structure S when blowing air straight backward. FIG. 8B is an operation explanatory diagram of the blowout structure S when blowing air upward. FIG. 8C is an operation explanatory diagram of the blowout structure S when blowing air downward. FIG. 9 is an operation explanatory diagram of the blowout structure S when blowing air rightward.

As shown in FIG. 8A, when a wind W is blown straight backward from the outlet 13 of the blowout structure S, the intermediate fin 33 of the drum fins 30 is arranged along a center line C of the case 1. To be more specific, the grip portion 34b of the lever member 34 shown in FIG. 2 is set in a neutral position.

Thus, as shown in FIG. 8A, the blowout structure S blows air from the air outlet 13 toward the vehicle interior R (see FIG. 1) so as to make the wind W travel straight backward.

As shown in FIG. 8B, when the wind W is blown upward from the outlet 13 of the blowout structure S, the intermediate fin 33 of the drum fin 30 is tilted so that the downstream side of the intermediate fin 33 is separated downward from the center line C of the case 1. To be more specific, the grip portion 34b of the lever member 34 shown in FIG. 2 is slid upward from the neutral position.

In this event, in the link mechanism 31 shown in FIG. 3, the long hole 34c side of the lever member 34 is moved downward. The arm member 35 connected to the lever member 34 rotates the drum fin 30 around the shaft portion 39 so that the intermediate fin 33 faces downward. The intermediate fin 33 shown in FIG. 8B comes into contact with the upper stopper face 7a of the pair of stopper faces 7a as the lock.

Thus, the drum fin 30 blows the wind W obliquely downward with respect to the inner wall surface of the lower plate member 1b. Thereafter, the wind W flows backward along the inner wall surface of the lower plate member 1b and also flows into the airflow guide portion 14 of the bezel member 1d. To be more specific, the wind W flows along the lower inner wall surface of the general portion 14a of the bezel member 1d, and changes the flow to obliquely upward at the lower inclined portion 14b of the bezel member 1d.

As shown in FIG. 8B, the blowout structure S blows the wind W obliquely upward from the outlet 13 to the vehicle interior R (see FIG. 1) side.

As shown in FIG. 8C, when the wind W is blown downward from the outlet 13 of the blowout structure S, the intermediate fin 33 is tilted so that the downstream side of the intermediate fin 33 of the drum fin 30 is separated upward from the center line C of the case 1. To be more specific, the grip portion 34b of the lever member 34 shown in FIG. 2 is slid downward from the neutral position.

In this event, in the link mechanism 31 shown in FIG. 3, the long hole 34c side of the lever member 34 is moved upward. The arm member 35 connected to the lever member 34 rotates the drum fin 30 around the shaft portion 39 so that the intermediate fin 33 faces upward. The intermediate fin 33 shown in FIG. 8C has its front end come into contact with the lower stopper face 7a of the pair of stopper faces 7a as the lock.

Thus, the drum fin 30 blows the wind W obliquely upward with respect to the inner wall surface of the upper plate member 1a. Thereafter, the wind W flows backward along the inner wall surface of the upper plate member 1a and also flows into the airflow guide portion 14 of the bezel member 1d. To be more specific, the wind W flows along the upper inner wall surface of the general portion 14a of the bezel member 1d and changes the flow to obliquely downward at the upper inclined portion 14b of the bezel member 1d.

As shown in FIG. 8C, the blowout structure S blows the wind W obliquely downward from the outlet 13 to the vehicle interior R (see FIG. 1) side.

As shown in FIG. 9, when the wind W is blown rightward from the outlet 13 of the blowout structure S, the vertical fin 21 is tilted so that the rotating end located on the downstream side of the vertical fin 21 is separated from the inner wall surface of the left side plate member 1c. To be more specific, the grip portion 23a of the operator 23 shown in FIG. 2 is slid rightward.

In this event, the bifurcated portion 23b of the operator 23 shown in FIG. 9 moves the engaging pin 21c of the vertical fin 21d rightward. Thus, the vertical fin 21d is rotated counterclockwise about the rotation shaft 21a. Then, the other vertical fins 21 connected by the connecting member 22 via the connecting pins 21b of the vertical fins 21d are each rotated counterclockwise about each rotation shaft 21a in conjunction with the vertical fins 21d.

Thus, the vertical fin 21 is tilted so that the rotating end located on the downstream side is separated from the inner wall surface of the left side plate member 1c.

As shown in FIG. 9, the blowout structure S blows the wind W obliquely rightward from the outlet 13 to the vehicle interior R side.

Then, as shown in FIG. 9, some of the wind W that has flowed into the main ventilation passage 5 of the case 1 is blown out of the outlet 12 to the vertical fin 21 side through the bypass flow path 10.

To be more specific, as shown in FIG. 8A, when the wind W is blown straight backward from the outlet 13 of the blowout structure S, the wind W that has flowed into the main ventilation passage 5 from the inlet 17 flows into the bypass flow path 10b from the notch recess 38a of the end plate 38 via the inlet 11b.

In this event, on the downstream side of the upper and lower fins 36 and 37, the flow of the wind W is restricted by the upper and lower fins 36 and 37, and the flow of the wind W into the inlet 11a of the bypass flow path 10a and the inlet 11c of the bypass flow path 10c is also restricted.

Then, the wind W flowing into the bypass flow path 10b joins the main ventilation passage 5 again from the outlet 12b. Thus, the wind W is blown to the vertical fin 21 (see FIG. 6) side as described above.

As shown in FIG. 8B, when the wind W is blown upward from the outlet 13 of the blowout structure S, the drum fin 30 is rotated so that the rear portion of the intermediate fin 33 faces downward as described above. Thus, some of the wind W that has flowed into the main ventilation passage 5 from the inlet 17 flows into the bypass flow path 10c through the inlet 11c.

In this event, the inlet 11b of the bypass flow path 10b is closed by the bypass flow path on-off valve 38b of the end plate 38. On the downstream side of the front portion of the intermediate fin 33 that comes into contact with the upper stopper face 7a, the flow of the wind W is restricted by the intermediate fin 33, and the flow of the wind W into the inlet 11a of the bypass flow path 10a is also restricted.

Then, the wind W that has flowed into the bypass flow path 10c joins the main ventilation passage 5 again from the outlet 12c. Thus, the wind W is blown to the vertical fin 21 (see FIG. 6) side as described above.

As shown in FIG. 8C, when the wind W is blown downward from the outlet 13 of the blowout structure S, the drum fin 30 is rotated so that the rear portion of the intermediate fin 33 faces upward as described above. Thus, some of the wind W that has flowed into the main ventilation passage 5 from the inlet 17 flows into the bypass flow path 10a through the inlet 11a.

In this event, the inlet 11b of the bypass flow path 10b is closed by the bypass flow path on-off valve 38b of the end plate 38. On the downstream side of the front portion of the intermediate fin 33 that comes into contact with the lower stopper face 16, the flow of the wind W is restricted by the intermediate fin 33, and the flow of the wind W into the inlet 11c of the bypass flow path 10c is also restricted.

Then, the wind W that has flowed into the bypass flow path 10a joins the main ventilation passage 5 again from the outlet 12a. Thus, the wind W is blown to the vertical fin 21 (see FIG. 6) side as described above.

Advantageous Effect

Next, an advantageous effect achieved by the blowout structure S of this embodiment will be described.

The blowout structure S of this embodiment is formed so that the outlet 12 of the bypass flow path 10 that joins the main ventilation passage 5 faces the vertical fin 21 of the first wind direction adjuster 2.

According to this blowout structure S, the wind W that joins the main ventilation passage 5 again from the outlet 12 of the bypass flow path 10 flows in a direction of pressing a wind through flow, which tends to flow along the inner wall surface of the case 1 in the main ventilation passage 5, against the vertical fin 21 side.

Thus, the blowout structure S effectively prevents the generation of through flow without a rib provided on the inner wall surface of the case as in the conventional blowout structure (see, for example, Patent Literature 1). According to the blowout structure S of this embodiment, directivity of the wind on the downstream side of the outlet 13 is further improved.

In the blowout structure S, wind also flows through the bypass flow path 10 in parallel with the main ventilation passage 5. The blowout structure S can increase the cross-sectional area of the flow path in the case 1 as compared with the one without the bypass flow path 10. The blowout structure S can reduce pressure loss when passing the air blown from the air conditioner.

Thus, the blowout structure S can reduce energy loss when blowing air due to ventilation resistance and can effectively suppress the generation of blowing noise due to increased wind flow velocity.

In the blowout structure S of this embodiment, the outlet 12 of the bypass flow path 10 faces the vertical fin 21 on the upstream side of the rotation shaft 21a of the vertical fin 21 (first fin).

According to this blowout structure S, the wind directivity on the downstream side of the outlet 13 is further improved.

In the blowout structure S of this embodiment, the vertical fin 21 is of the fin shut type, and the outlet 12 of the bypass flow path 10 faces the vertical fin 21 (first fin) on the upstream side of the rotation shaft 21a of the vertical fin 21.

According to this blowout structure S, the vertical fin 21 in the shut fin state can block the wind flowing through the main ventilation passage 5 at the outlet 13 and can also block the wind flowing through the bypass flow path 10 at the outlet 13.

In the blowout structure S of this embodiment, the drum fin 30 (second fin) that changes the wind direction in the vertical direction is provided in the case 1, and the plurality of bypass flow paths 10 are provided in line in the vertical direction.

According to this blowout structure S, even if the wind direction in the case 1 is biased in the vertical direction of the main ventilation passage 5 by the drum fin 30 (second fin), the wind efficiently flows through the bypass flow path 10.

In the blowout structure S of this embodiment, the drum fin 30 (second fin) has the bypass flow path on-off valve 38b that opens and closes the inlet 11 of the bypass flow path 10 so as to pass the wind through a predetermined bypass flow path 10 selected from among the plurality of bypass flow paths 10 according to the rotation angle.

According to this blowout structure S, even if the wind direction in the case 1 is biased in the vertical direction of the main ventilation passage 5 by the drum fin 30 (second fin), the wind flows through the bypass flow path 10 more efficiently.

Although the embodiment has been described above, the present invention is not limited to this embodiment and can be implemented in various forms.

Example

Next, description is given of an example and a comparative example of the present invention where the effect of the blowout structure S according to this embodiment is verified.

Example

In the example, in the blowout structure S shown in FIG. 6, the drum fin 30 is set to the state shown in FIG. 8A, and a wind pressure distribution on the downstream side of the outlet 13 when the vertical fin 21 is tilted at a predetermined angle so as to blow air rightward is obtained by computer aided engineering (CAE).

Figure 10A:
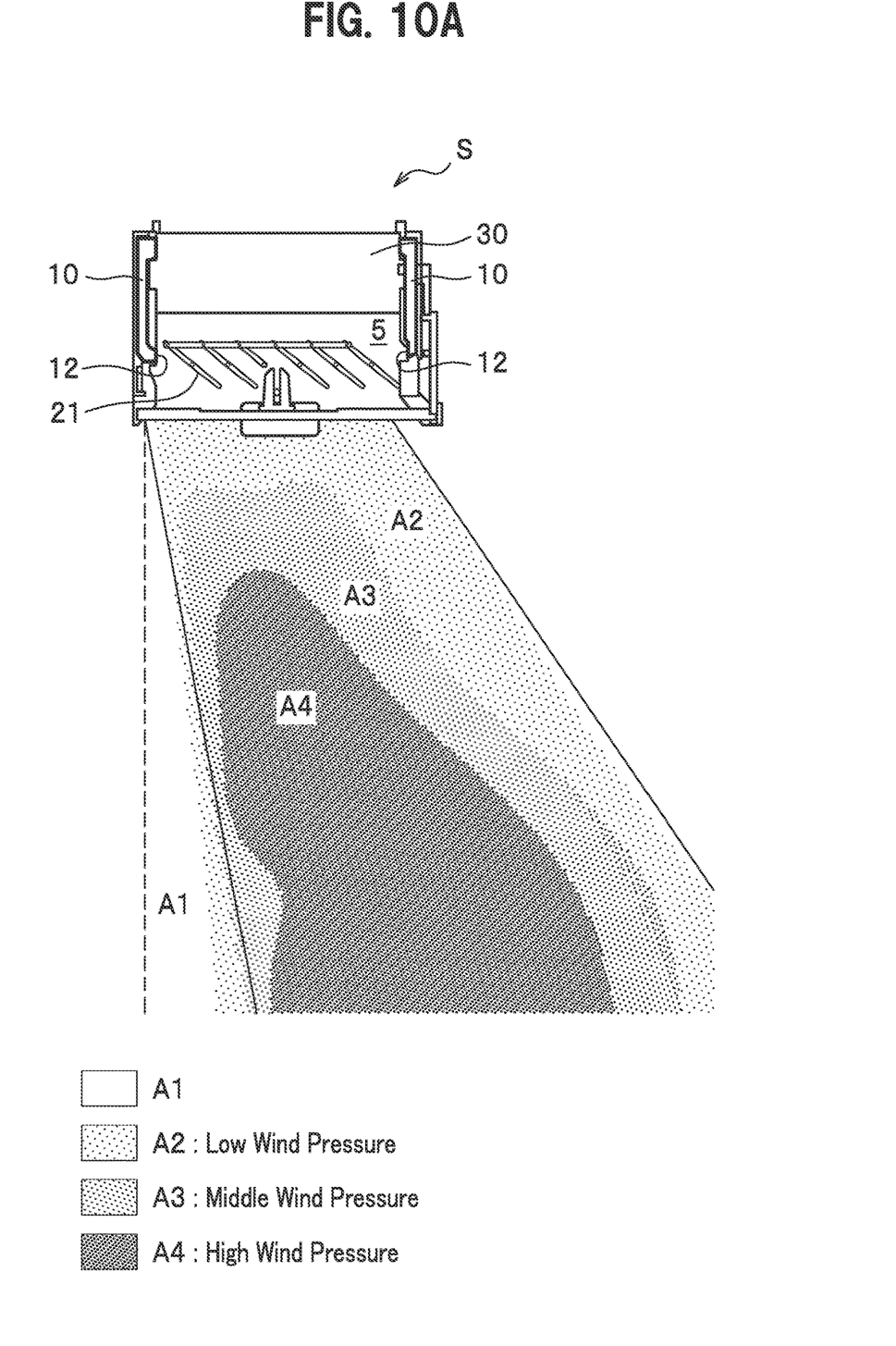
FIG. 10A is a wind pressure distribution chart according to an example where an effect of the present invention is verified.

FIG. 10A shows the results. In FIG. 10A, reference numeral 21 denotes the vertical fin, reference numeral 30 denotes the drum fin, reference numeral 5 denotes the main ventilation passage, and reference numeral 12 denotes the outlet of the bypass flow path 10.

The wind pressure distribution in FIG. 10A is represented by a white region A1 having the lowest wind pressure [Pa] and a "low wind pressure" region A2, a "middle wind pressure" region A3, and a "high wind pressure" region A4, which are obtained by changing the density of the shaded area in three stages. That is, the magnitude of the wind pressure [Pa] satisfies the relational expression of region A1<region A2<region A3<region A4.

In the example, a difference in wind pressure between the inlet 17 (see FIG. 4) and the outlet 13 (see FIG. 4) is measured. The difference in wind pressure is 82 [Pa].

Comparative Example

Figure 10B:
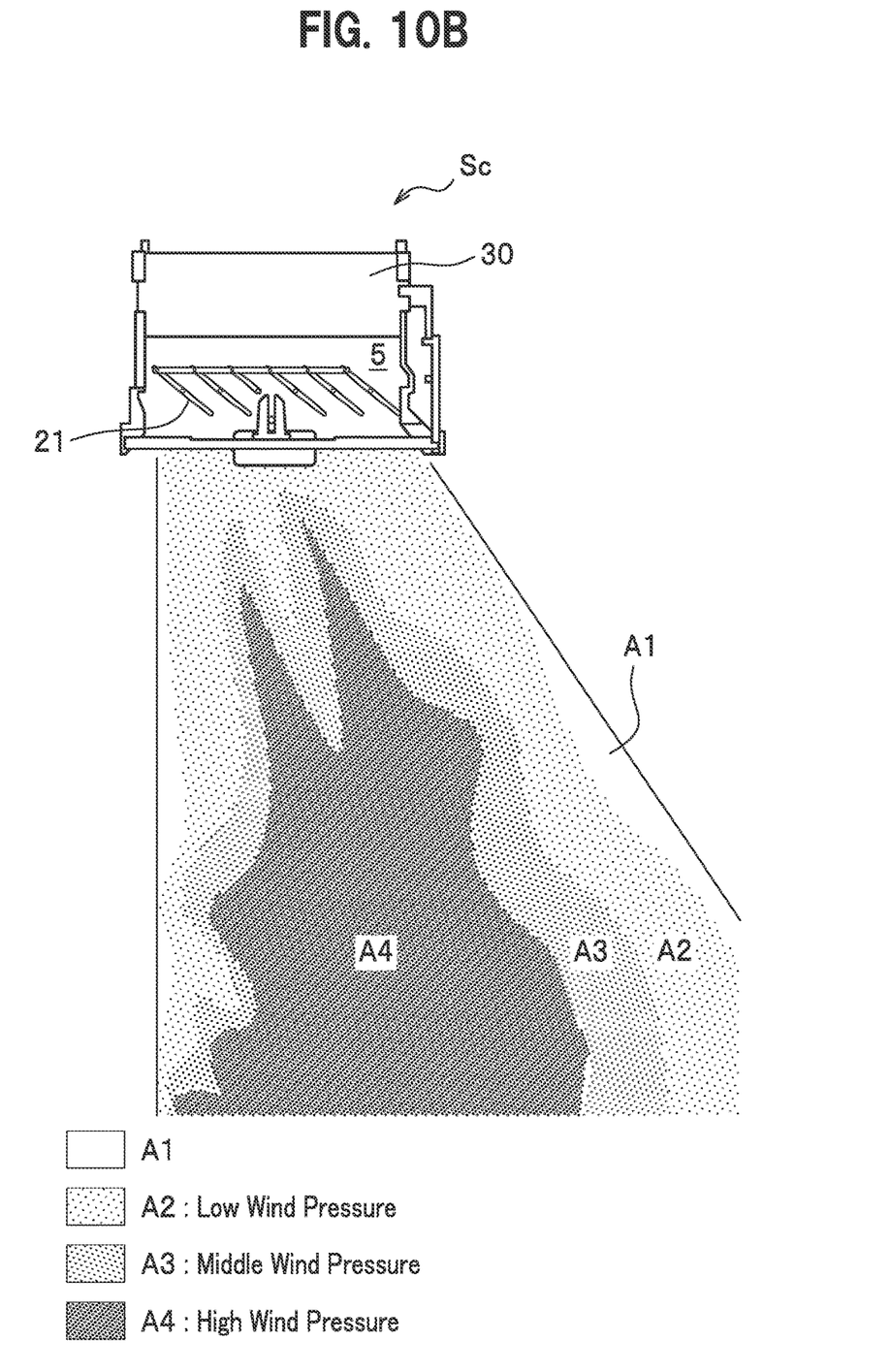
FIG. 10B is a wind pressure distribution chart according to a comparative example where the effect of the present invention is verified.

In the comparative example, as for a blowout structure Sc shown in FIG. 10B having the same configuration as that of the example except that the bypass flow path 10 in the blowout structure S according to the example is not provided, a wind pressure distribution on the downstream side of the outlet 13 is obtained in the same manner as the example. In FIG. 10B, the same components as those in FIG. 10A are denoted by the same reference numerals.

A difference in wind pressure between the inlet 17 and the outlet 13 in the comparative example is 86 [Pa].

(Evaluation Result)

As shown in FIG. 10B, as for the blowout structure Sc of the comparative example, the wind pressure distribution on the downstream side of the outlet 13 represents high rectilinearity of the wind W from the left side portion of the outlet 13. Therefore, the directivity of the wind W is low. This is considered to be due to the through flow of the wind W along the left inner wall surface of the case 1.

On the other hand, as shown in FIG. 10A, in the blowout structure S of the example, the blowing range of the rightward wind W is controlled to be narrower than that of the blowout structure Sc of FIG. 10B. It is verified that the blowout structure S of the example has improved directivity of the wind W from the outlet 13 by having the bypass flow path 10.

It is verified that the blowout structure S of the example can reduce the pressure loss by having the bypass flow path 10.

What is claimed is:

1. A blowout structure of an air conditioner, the blowout structure comprising:
   a case connected to a duct that serves as a blast passage from an air conditioner of a vehicle;
   an inlet provided on a duct side of the case and connected to the duct;
   an outlet that is provided on a vehicle interior side of the case and blows out wind toward a vehicle interior;
   a main ventilation passage formed inside the case from the inlet to the outlet;
   a first wind direction adjuster that changes a wind direction from the inlet to the outlet by rotating in a vehicle left-right direction of the main ventilation passage; and
   a bypass flow path of the main ventilation passage, which extends along the main ventilation passage on both sides of the main ventilation passage in the vehicle left-right direction, wherein an outlet of the bypass flow path that joins the main ventilation passage is formed so as to overlap with the first wind direction adjuster when viewed in the vehicle left-right direction.

2. The blowout structure of an air conditioner according to claim 1, wherein the first wind direction adjuster includes a plurality of first fins arranged in line along an opening surface of the outlet, with each of the plurality of first fins provided to be rotatable around a respective rotation shaft and the plurality of first fins configured to control the wind direction according to a rotation angle of the plurality of first fins, and the outlet of the bypass flow path faces the plurality of first fins on an upstream side of the respective rotation shaft of each of the plurality of first fins.

3. The blowout structure of an air conditioner according to claim 2, wherein the plurality of first fins are configured to close the outlet according to the rotation angle.

4. The blowout structure of an air conditioner according to claim 1, wherein inside the case, a second wind direction adjuster that changes the wind direction in a vertical direction is provided on an upstream side of the first wind direction adjuster, and a plurality of bypass flow paths are provided in alignment with each other in the vertical direction, wherein the plurality of bypass flow paths include the bypass flow path.

5. The blowout structure of an air conditioner according to claim 4, wherein the second wind direction adjuster includes a second fin that controls the wind direction by rotating around a shaft portion, and the second fin has a bypass flow path on-off valve that opens and closes an inlet of the plurality of bypass flow paths so as to pass wind through a predetermined bypass flow path selected from among the plurality of bypass flow paths according to rotation angle of the second fin.

* * * * *